United States Patent
Caron et al.

(10) Patent No.: US 12,493,095 B2
(45) Date of Patent: Dec. 9, 2025

(54) DYNAMIC SEGMENTATION AND OCCUPANCY SCORING IN EDGE ENVIRONMENTS WITH MOBILE DEVICES FOR REAL-TIME DECISION MAKING

(71) Applicant: Dell Products L.P., Round Rock, TX (US)

(72) Inventors: Eric L. Caron, Ottawa (CA); Vinicius Michel Gottin, Rio de Janeiro (BR); Herberth Birck Fröhlich, Florianópolis (BR)

(73) Assignee: Dell Products L.P., Round Rock, TX (US)

(*) Notice: Subject to any disclaimer, the term of this patent is extended or adjusted under 35 U.S.C. 154(b) by 72 days.

(21) Appl. No.: 18/625,581

(22) Filed: Apr. 3, 2024

(65) Prior Publication Data

US 2025/0314734 A1  Oct. 9, 2025

(51) Int. Cl.
*G01S 13/56* (2006.01)
*G01S 5/00* (2006.01)
*G06K 7/10* (2006.01)

(52) U.S. Cl.
CPC .............. *G01S 5/016* (2020.05); *G01S 13/56* (2013.01); *G06K 7/10099* (2013.01)

(58) Field of Classification Search
None
See application file for complete search history.

(56) References Cited

U.S. PATENT DOCUMENTS

| | | | | |
|---|---|---|---|---|
| 6,040,774 A | * | 3/2000 | Schepps | G01S 13/74 340/904 |
| 10,877,430 B2 | * | 12/2020 | Rodel | G03G 21/1892 |
| 11,756,398 B2 | * | 9/2023 | Colaluca | G08B 29/185 340/572.4 |
| 2023/0252408 A1 | * | 8/2023 | Weakley | G06K 19/0723 705/28 |

OTHER PUBLICATIONS

Fortune, "A sweepline algorithm for Voronoi diagrams," ACM, 1986, pp. 313-322.
Schrijver, "on the history of the shortest path problem," Documenta Math., 2012 pp. 155-167.
Ferguson, et al, "A Guide to Heuristic-based Path Planning," American Association for Artificial Intelligence, 2005.

* cited by examiner

*Primary Examiner* — John F Mortell
(74) *Attorney, Agent, or Firm* — Workman Nydegger

(57) ABSTRACT

Occupancy aware decision-making is disclosed. Positions of entities in an environment are determined. Stationary entities are used as markers to segment the environment. Positions of non-stationary entities are used to determine an occupancy score for each of the segments. Decision making operations, such as pathfinding for mobile entities, can be performed using the occupancy scores of the segments. The occupancy scores and segmentation adapt to changes in the environment.

20 Claims, 11 Drawing Sheets

DYNAMIC SEGMENTATION AND OCCUPANCY SCORING IN EDGE ENVIRONMENTS WITH MOBILE DEVICES FOR REAL-TIME DECISION MAKING

TECHNOLOGICAL FIELD OF THE DISCLOSURE

Embodiments disclosed herein generally relate to real-time or near real-time decision making in an environment. More particularly, at least some embodiments relate to systems, hardware, software, computer-readable media, and methods for dynamically scoring occupancy levels in an environment for real or near real-time decision making.

BACKGROUND

There are many different types of environments or systems that benefit from scheduling and logistics. Warehouse environments are an example of environments in which logistics operations are desirable. More specifically, various types of vehicles or other equipment (e.g., forklifts, automated robots) may operate in an environment and managing the operations and movements of these vehicles is an important task.

More specifically, operating these vehicles, which may be automated, is associated with risks. Vehicles may cause accidents, loads may be lost, and the like. One of the manners in which risks are addressed and safety is improved is by performing logistics operations and by improving logistics operations. The ability to make decisions in real or near real time may prevent accidents or other unwanted incidents from occurring.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which.

DETAILED DESCRIPTION OF SOME EXAMPLE EMBODIMENTS

Figure 1:
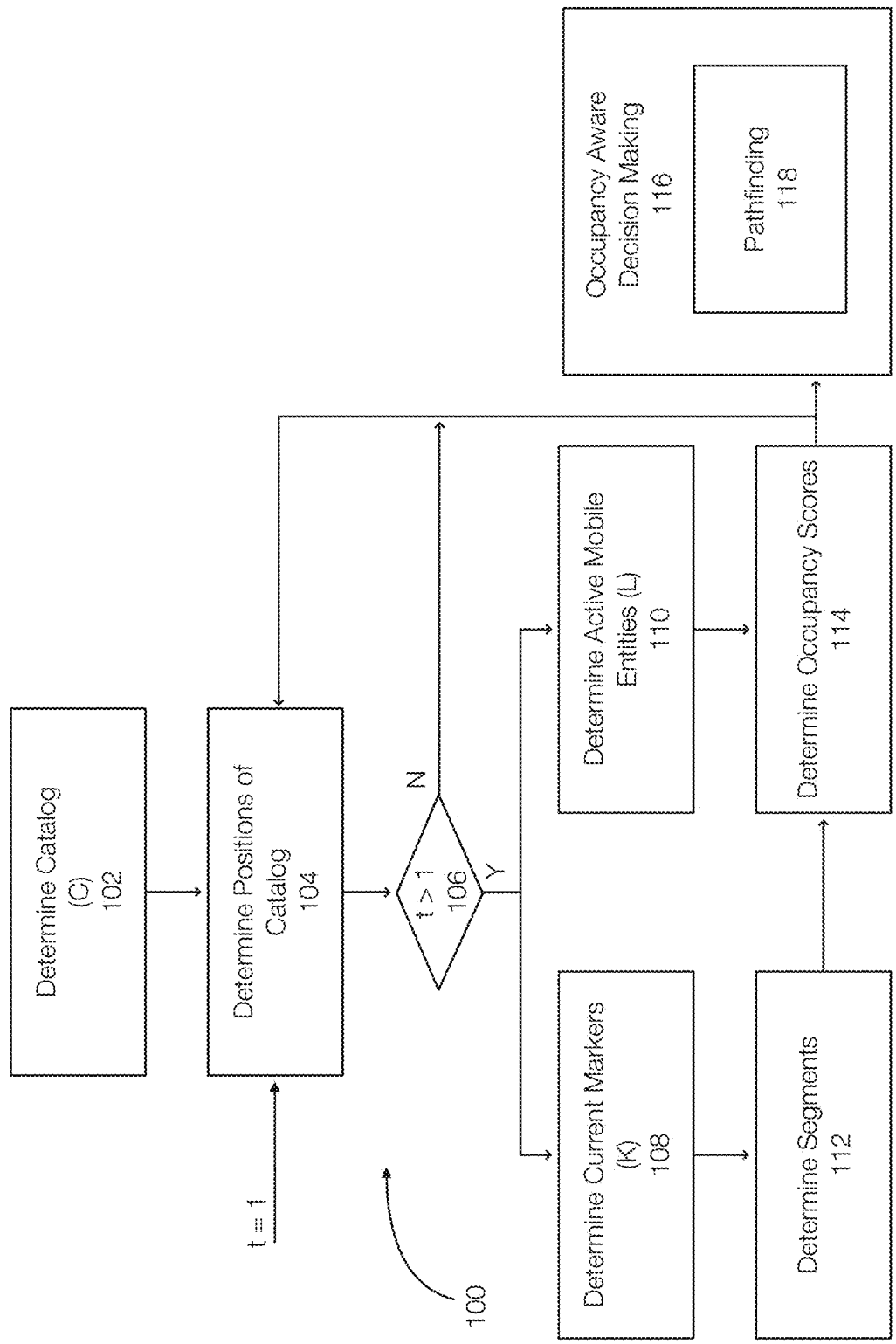
FIG. 1 discloses aspects of a method for generating occupancy scores and decision making operations.

Embodiments disclosed herein generally relate to decision making in an environment. More particularly, at least some embodiments relate to systems, hardware, software, computer-readable media, and methods for performing logistics operations with real or near real-time decision making.

Embodiments of the invention relate to performing logistics operations by dynamically segmenting an environment and performing occupancy scoring in the environment. The occupancy scores can be used to make or inform decisions or perform other logistics operations. The segmentation and corresponding occupancy scores are configured to be mapped to multiple representations that may be suitable for different tasks.

Embodiments of the invention are discussed in the context of an environment that includes mobile entities (e.g., forklifts, autonomous mobile robots (AMRs)) that are equipped with position tracking capabilities and/or other sensors. Embodiments of the invention are further discussed in the context of RFID (Radio Frequency Identification) positioning schemes and systems. RFID systems allow the positions of mobile entities to be tracked using passive RFID tags that can be read or scanned by RFID readers.

For example, fixed RFID readers may be positioned at multiple locations in the environment. This allows the positions of the mobile entities to be determined by reading the tags using the readers and triangulating the positions of the RFID tags over time. The number of RFID readers may change (e.g., add readers, inactive readers, remove readers). In addition, other positioning systems that can determine a position of a mobile entity may be used (e.g., UWB techniques). In addition to the mobile entities, RFID tags may be fixed to other locations in the environment (e.g., points of interest such as near a loading dock, pillars, shelves) and/or to objects that may be stationary or sometime stationary (e.g., pallets, signaling cones).

As previously described, operating mobile entities in an environment is challenging and poses multiple safety risks. Embodiments of the invention dynamically identify areas of the environment (e.g., using occupancy scores) that may be more prone or susceptible to accidents or other incidents related to the operation of the mobile entities. The occupancy scores may be used for pathfinding operations, inventory operations, maintenance operations, and the like. The specific operations (e.g., decision-making) or tasks performed using dynamic segmentation and occupancy scores may be domain dependent.

Risk-aware decision making can improve logistics and help prevent accidents and congestion, improve environment operations, and the like. In one example, occupancy may be viewed as a proxy for operational risk. Areas with higher occupancy inherently pose a higher risk. Embodiments of the invention relate to an occupancy representation that is adaptable to changes in the relevant domain (environment) and that can be updated quickly. For example, changes in positions of mobile entities may correspond to a significant change in the perceived risk. Different areas of the environment may experience different occupancies at different times. Embodiments of the invention are configured to adapt to changes in the environment including changes in the positions of mobile entities.

Embodiments of the invention may also be redundant in the sense of being able to function in the event that sensors or RFID devices/tags fail, are added/removed/activated/deactivated. Because some positioning systems, such as RFID based positioning systems, are susceptible to environment noise, distance, etc., embodiments of the invention also account for noise when determining the positions of entities or objects in the domain.

Embodiments of the invention enable real or near real-time mobile entity occupancy determinations for decision-making and logistics planning. Embodiments of the invention further relate to context-aware pathfinding operations, which is an example of a decision making operation. The path may generate a route or path that accounts for current occupancy scores and reduces the risk associated with traversing the path or route.

Embodiments of the invention further allow for decision making operations that use both stationary entities/objects as markers in the environment. Once the markers are determined, the space or environment is segmented with respect to the markers to generate a segmented space and occupancy information is determined with respect to the segments. In one example, these operations (at least segmentation and occupancy scoring) are performed in a periodic of cyclic manner. During each cycle, multiple positioning readings may be performed. Thus, the position of a mobile entity for a given cycle may be determined from a history of position readings.

As previously stated, embodiments of the invention are discussed in the context of RFID tags/readers. Generally, the coordinates of the RFID readers are precisely known in the domain and are used to determine the relative position of the RFID tags. The noise in the readings may introduce a level of uncertainty, which can be reduced using additional readers at additional expense. Further, the readings obtained for moving entities is generally subject to a larger deviation/noise compared to readings obtained for static or stationary objects.

FIG. 1 discloses aspects of a method for generating occupancy scores and decision making operations. The method 100 may include aspects that may be performed at different frequencies or independently. For example, the method 100 many include determining 102 a catalog (C) of all tags in an environment. In this example, the catalog is a catalog of tags for all entities in the environment. Entities may include mobile entities/objects, stationary entities/objects, fixed entities/objects or the like.

The method 100 may be performed periodically, cyclically, or in another manner. At an initial cycle (e.g., t=1), the positions of the tags in the catalog may be determined 104 using the positioning mechanism (e.g., RFID positioning). Thus, the positions of the entities associated with the tags determined from the readings $r(C)_t$ at a timestamp along with the positions of the active readers are received. In this example, the timestamp t refers to a cycle or is used as an index. In one embodiment a cycle t may include positioning readings with more specific timestamps.

The method 100 thus relates to a cycle. When the cycle is triggered (starting at t=2), the segmentation operation, scoring operation, and/or decision-making operations are performed for that cycle.

In this example of a cycle, t=2. Thus, the method is triggered when t>1 (Y at 106). When t>1, the method 100 determines 108 which of the tags are stationary. The entities or objects determined to be stationary are deemed to be a set of markers K. The positions of the stationary markers, from the readings $r(C)_t$ at timestamp or cycle t, along with the positions of the active RFID readers, are used to segment 112 the floor space into a set of segments $S_k$. This may be represented as a segmented space.

The active mobile entities (L) in the environment are also determined 110 for this current cycle. The positioning or positions of the active and currently moving entities (L) are then projected or mapped into the set of segments. This allows the occupancy s of each of the segments to be evaluated or scored. Thus, the occupancy scores for each of the segments is determined 114. In one example, the occupancy relates to moving entities in the environment.

The occupancy scores may be used for occupancy aware decision making 116, which may include pathfinding 118.

In one example, the decision making 116 accounts for the fact that moving entities are typically subject to more risk than other entities/objects. For instance, segments with higher occupancy scores are more congested and present more risk. Dynamically segmenting (and/or repeatedly segmenting) the space allows the risk to be informed with locality information (e.g., the locality of a segment in the space or environment. To improve the locality information, mobile entities that are currently stationary may be counted as stationary markers for a current segmentation operation or cycle. A dynamic segmentation may also account for changes in the positioning mechanism or system (e.g., readers deactivated/activated).

The dynamic representation can be used to determine occupancy for different kinds of representations of the environment. Different representations of the occupancy may be suitable for different types of tasks. Although the cycles are represented as periodic, it is possible for a cycle to trigger. For example, excessive movement may trigger a cycle. In one example, this may allow a pathfinding operation to adapt to the changing occupancy in specific localities.

The method 100 may be performed repeatedly. For example, another cycle may be triggered for t=3. Alternatively, the method may be repeated periodically (e.g., a new cycle begins every x seconds). Once the catalog is determined, the segmented space and occupancy scores can be redetermined based on the stationary/mobile entities for a given cycle. Further, any decisions made from a previous cycle may be revisited or confirmed during subsequent cycles. In addition, tags may be added/removed over time. Thus, from time to time the catalog may be redetermined as well. This may be inherent when the positions of the entities are determined because new tags will be read and inactive or missing tags will not. Thus, the entities present in the environment may be automatically detected when detecting the positions of the entities.

Figure 2:
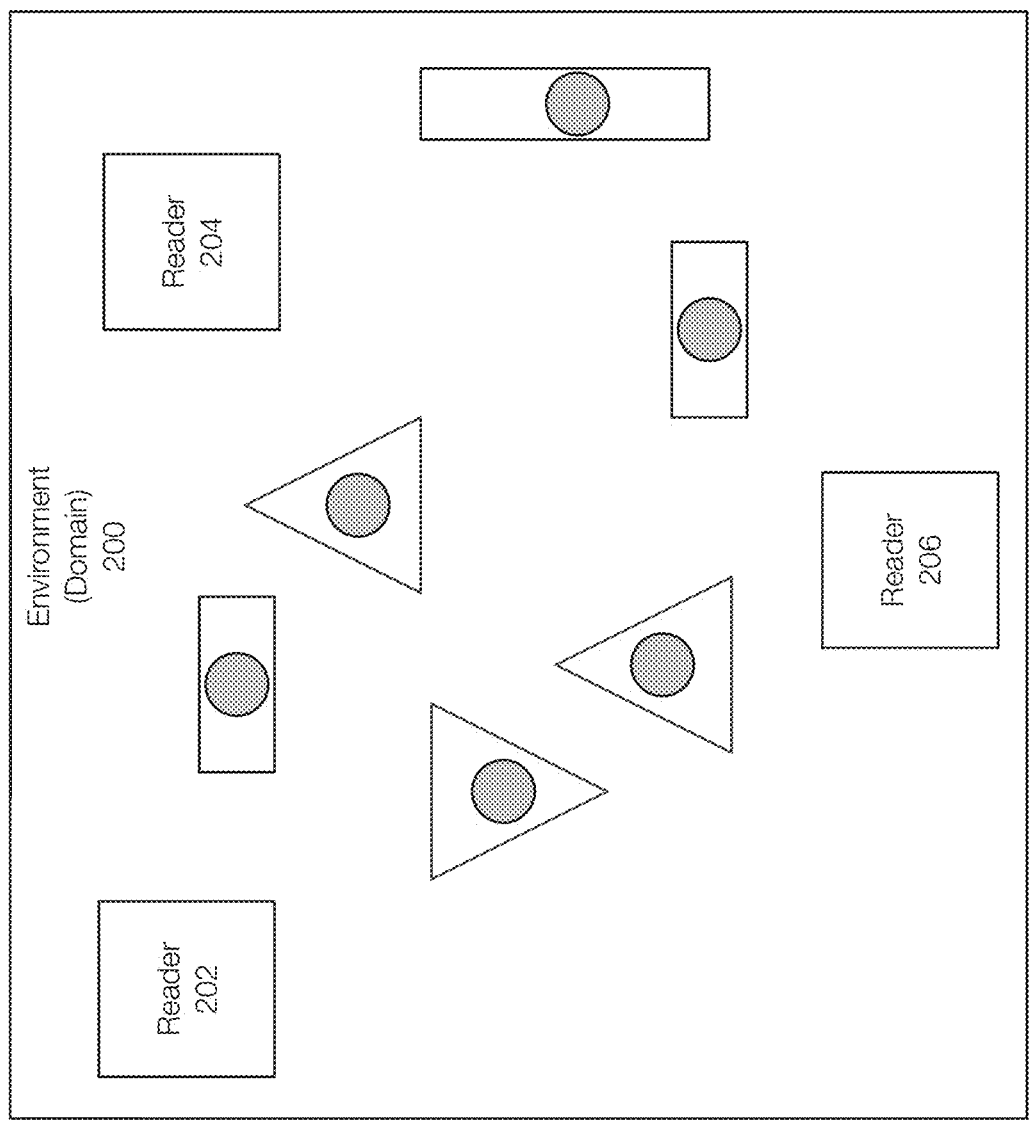
FIG. 2 discloses aspects of an environment or domain in which logistics operations are performed.
Figure 2:
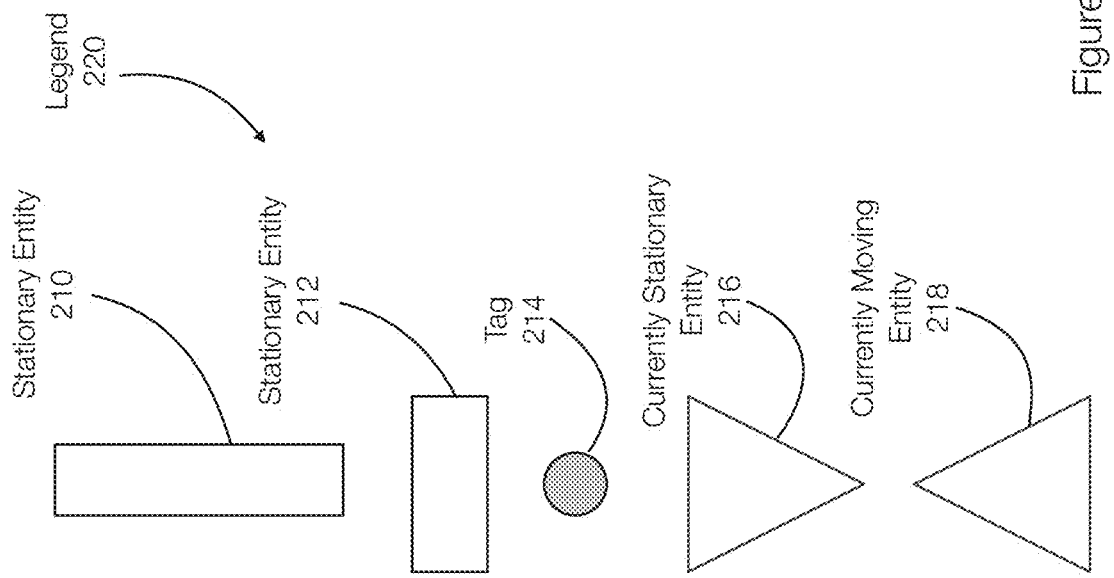

FIG. 2 discloses aspects of an environment or domain in which logistics operations are performed. Although the environment 200 is described with reference to objects and entities, the disclosure may refer to any tagged object as an entity. In one embodiment, one aspect of the invention relates to distinguishing an entity based on whether they are mobile or stationary.

FIG. 2 illustrates an environment (domain) 200 that tracks entities using a positioning mechanism such as RFID readers/tags. At a given point of time, the status of entities (or objects) (e.g., stationary/mobile) in the environment 200 may change. The legend 220 illustrates examples of entities that may be present in the environment 200.

For example, the stationary entity 210 may represent objects or locations such as a loading dock, a door, pillars, or the like. The stationary entity 210 may represent immovable objects. The stationary entity 212 may represent objects that may be stationary some of the time. For example, a pallet may be stationary some of the time and may be moved as well. Thus, the position of the entity 212 may change. A currently stationary entity 216 may represent a forklift or autonomous robot that is currently stationary or not moving. A currently moving entity 218 identifies entities that are currently moving in the environment. The status of an entity (stationary/moving) may be determined using one or more position measurements or readings.

Each of the entities 210, 212, 216, and 218 are associated with a respective tag 214. An RFID tag that can be read by readers 202, 204, and/or 206 (e.g., RFID readers) is an example of a tag that may be used (read by a reader) to determine a position of the tagged entity. The positions of always stationary entities, such as a loading dock, may not require a tag as their position does not change.

In this example, a catalog of tracked entities may include a catalog of tags that are deployed in the environment 200. Each of the tags may have a unique identifier and be associated with an entity (moving, capable of moving or of being moved, permanently stationary) in the environment 200. However, entities are generally referred to as mobile or stationary for a given cycle.

The catalog C of all tags is a catalog of the entities in the environment and may be represented as C=S∪M. In this example, S includes a set of all stationary entities (i.e., tags affixed to entities that can be moved or are stationary, but are not currently mobile) and M includes a set of all tags affixed to mobile entities (e.g., forklifts, autonomous mobile robots) that are currently moving.

Stationary entities in a logistics environment could be pallets, for example, or other objects used as delimiters and environment markers (i.e., signaling barriers, cones, shelves, etc.).

For ease of explanation, a 1:1 relationship is assumed between tags and entities. However, it is understood that a single entity may be associated with multiple tags. In addition to positioning operations, tags may be used to monitor entities (e.g., where available pallets are stored, monitor proximity between pallets or shelves and mobile entities, inventory location, or the like).

Further, there is no requirement to specify any tag as being explicitly mobile or explicitly stationary. More specifically, embodiments of the invention use at least some of the tags as markers to segment the environment such that the segments can be evaluated for occupancy.

Figure 3A:
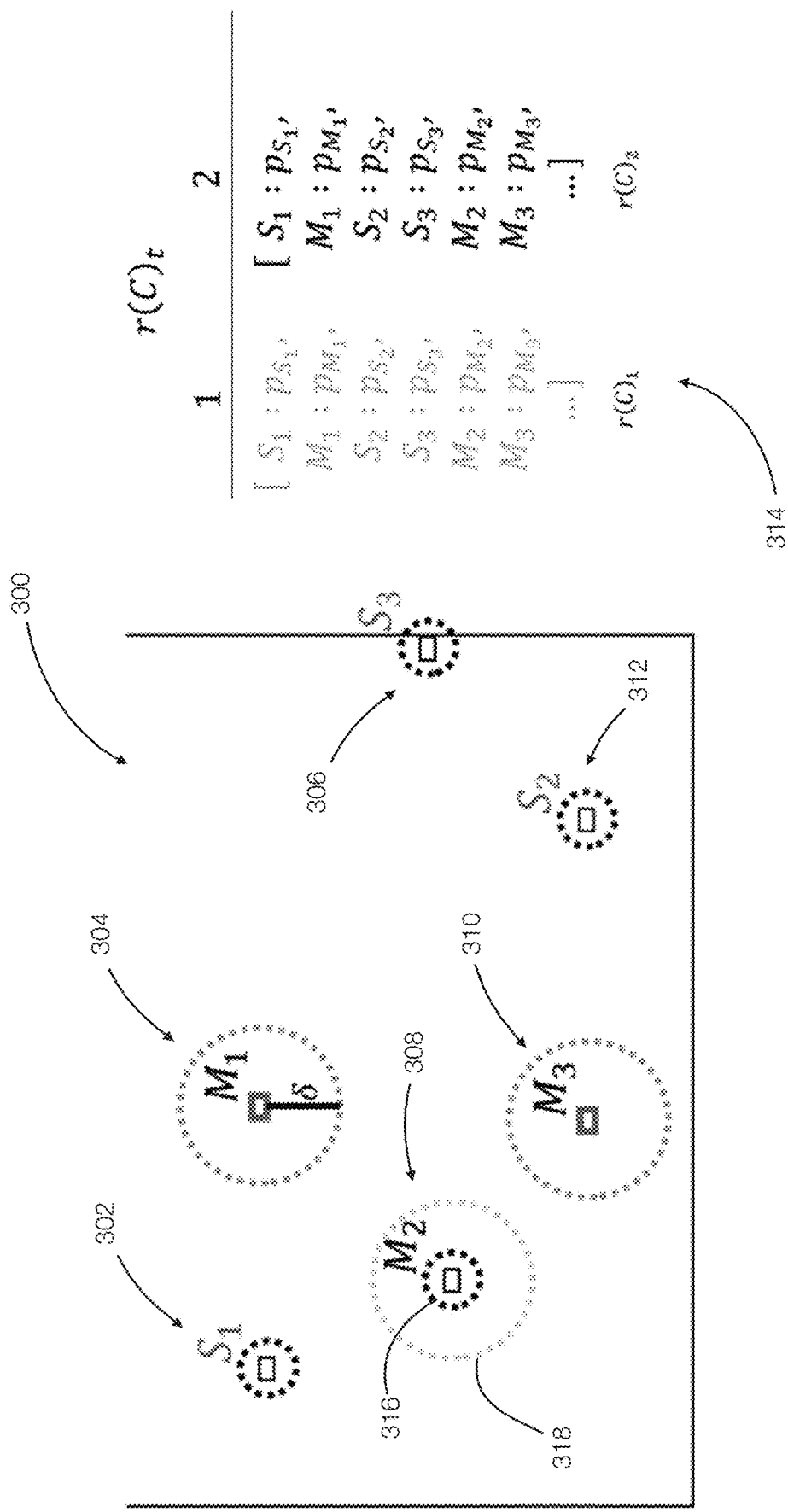
FIG. 3A discloses aspects of positional readings in an environment.

FIG. 3A discloses aspects of positional readings in an environment. FIG. 3A illustrates an environment 300, which is an example of the environment 200. Entities (mobile and stationary) include entities 302, 304, 306, 308, 310, and 312 and each are associated with a tag. M designates mobile entities and S designates stationary entities in FIG. 3A. A positioning mechanism or system (e.g., an RFID positioning system) may operate to determine or obtain readings from tags in the environment 300. The positions may be determined via trilateration with respect to deployed and active readers in the environment 300 or in another manner.

FIG. 3A further illustrates readings 313 r(C) for all entities in the catalog of tags associated with the environment 300. The readings 314 include a reading p (position) associated to each tag at each timestamp t (cycle). FIG. 3A also illustrates noise in the position readings using dotted lines. In this example, the dotted lines 316 and 318 are illustrated to convey the error or noise when the entity 308 is deemed a mobile entity (dotted line 318) and when the entity 308 is deemed a stationary entity (dotted line 316). In other words, because embodiments of the invention have a dynamic aspect, some mobile entities may be deemed stationary at different times or cycles.

In this example, the position readings 314 are timestamped and the timestamps are summarized with a cycle index t=1, 2, . . . , such that readings obtained up to a limit timestamp define each cycle.

In this example, the noise of the readings 314, represented by the dotted lines around the position points, are represented to be an average noise δ for moving entities in the domain or environment 300. The value of δ may be informed, such as by a domain specialist based on previous guided acquisition, or obtained dynamically from the sequence of readings of stationary objects. As previously stated, the typical noise for stationary entities, which is usually less than δ (see dotted line 316) is also illustrated.

In this example, the readings 314 (or structure r(C)) stores the position $p_c$ for each entity c in the environment 300 for a certain cycle. In this example, $r(C)_t$ denotes the position readings at cycle t. The position readings may be derived or determined from a history of position readings over a time period corresponding to the cycle in one example. Thus, in one example, more than one position reading may be available from each tag over the period that constitutes a cycle. This may be due to the cycle being long, such that a tag may provide multiple readings in that time span and/or due to multiple tags being associated to each entity. The readings 314, however, include the readings used for determining occupancy scores in one example.

In one example, the positioning system may determine a best estimated position for each entity. In one instance, for repeated readings of the same tag, the most recent position reading may be used. In another example, depending on the noise, a weighted average with preference for the most recent position reading may be used. If an entity has multiple tags, the readings may be aggregated or combined.

Over time, new cycles are performed and, for the next limit timestamp or cycle, a new cycle with a new set of readings may be defined or determined. Starting from the second cycle (i.e., second set of available readings where t=2), current markers may be determined. In other words, current markers are determined for each new cycle.

In one example, a set of K markers in the environment 300 are defined as:
the positions of all active RFID readers $R_1, R_2, \ldots$; and
the positions of all tags in the catalog that have not moved for the past cycle.

In one example, the set K of markers is defined as $$K = R \cup \{c | c \in C \land \text{abs}(r(c)_{t-1} - r(c)_t) < a\delta\} \qquad \text{equation (1)}.$$

As previously stated, a mobile entity may be determined to be a marker in some circumstances. In this formula, a constant (α) is used such that an absolute difference between the positions of an entity in a previous and current cycles must be smaller than that factor a of the typical noise/deviation in the position readings to be considered stationary.

Figure 3B:
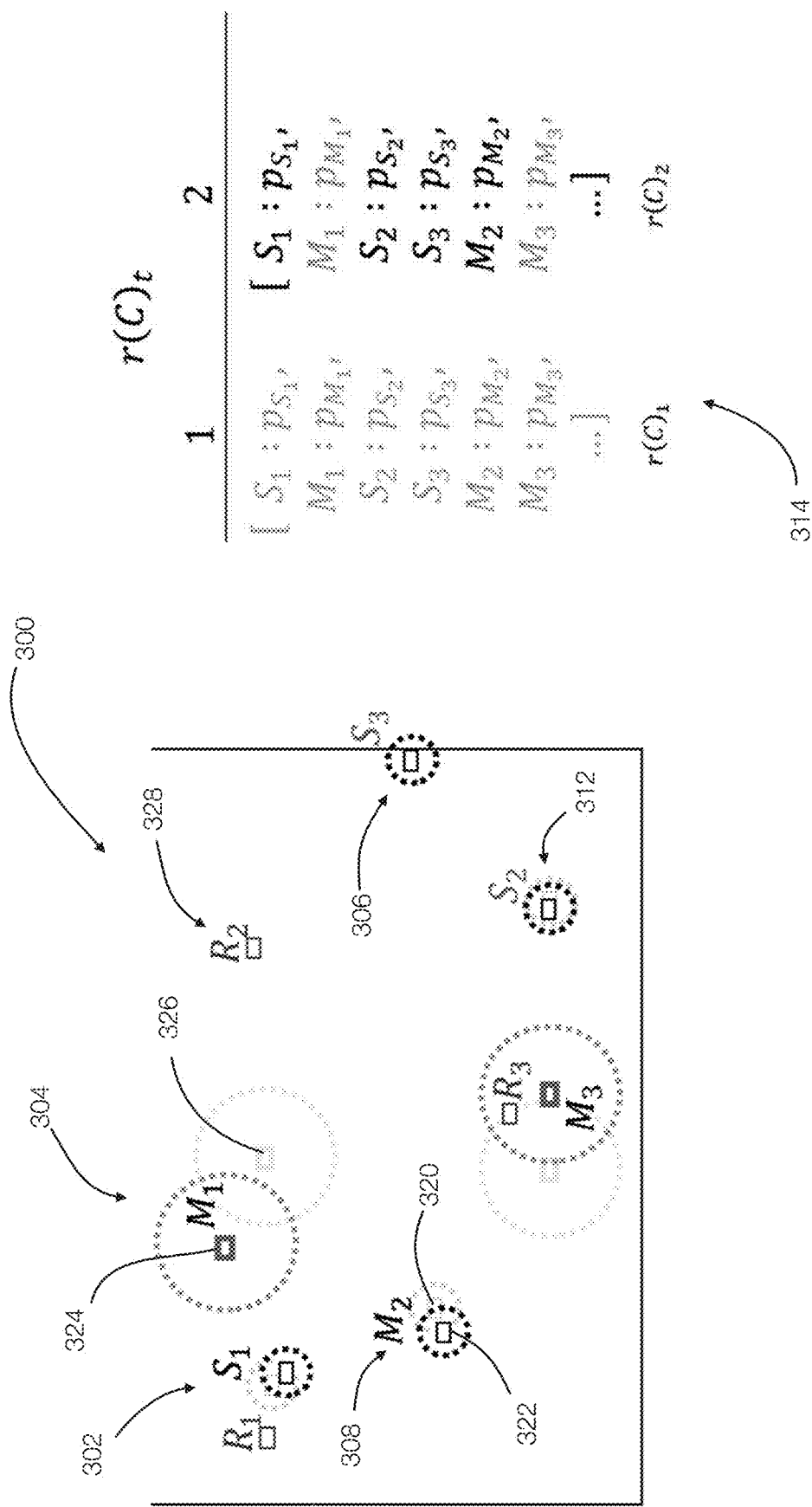
FIG. 3B discloses aspects of determining whether an entity is stationary or mobile.

FIG. 3B discloses aspects of determining whether an entity is stationary or mobile. This determination is performed to determine which of the entities in the environment are deemed to be stationary entities (and thus markers) for a segmentation operation., In this example of FIG. 3B, the entity 308 has moved from a position 320 to a position 322. Because this is below the threshold movement and because the entity 308 satisfies equation (1), the entity 308, which is a mobile entity, is deemed to be stationary and is considered to be a marker for the cycle. As illustrated further in FIG. 3B, the entity 304 has moved from the position 326 to the position 324. Because this distance is greater than the threshold or does not satisfy equation (1), the entity 304 is not a marker for the cycle. FIG. 3B also illustrates readers ($R_1$, $R_2$, $R_3$), represented by the reader 328. The readers are generally considered to be markers at least because their position is known more precisely.

After determining whether the entities in the environment 300 are stationary or mobile, markers are identified for the cycle. FIG. 3B illustrates markers or stationary entities 308, 302, 306, and 312 (mobile entity $M_2$ and static entities or objects $S_1$, $S_2$, $S_3$) for cycle t=2. The receivers may also be markers as previously stated. In FIG. 3B, the markers are defined or determined from the active readers and tags of entities c∈C that have not moved (or moved less than a threshold) in the most recent set of position readings.

In one example, separating the tags with respect to the stationary entities S and mobile entities M is for explanation purposes. Entities considered to be stationary may not always be stationary. For example, a forklift may pick up and move a pallet, an operator may move a signal cone, the positions of shelves in the warehouse may be rearranged, or the like.

After the markers are determined, the environment 300 or space is segmented.

Figure 3C:
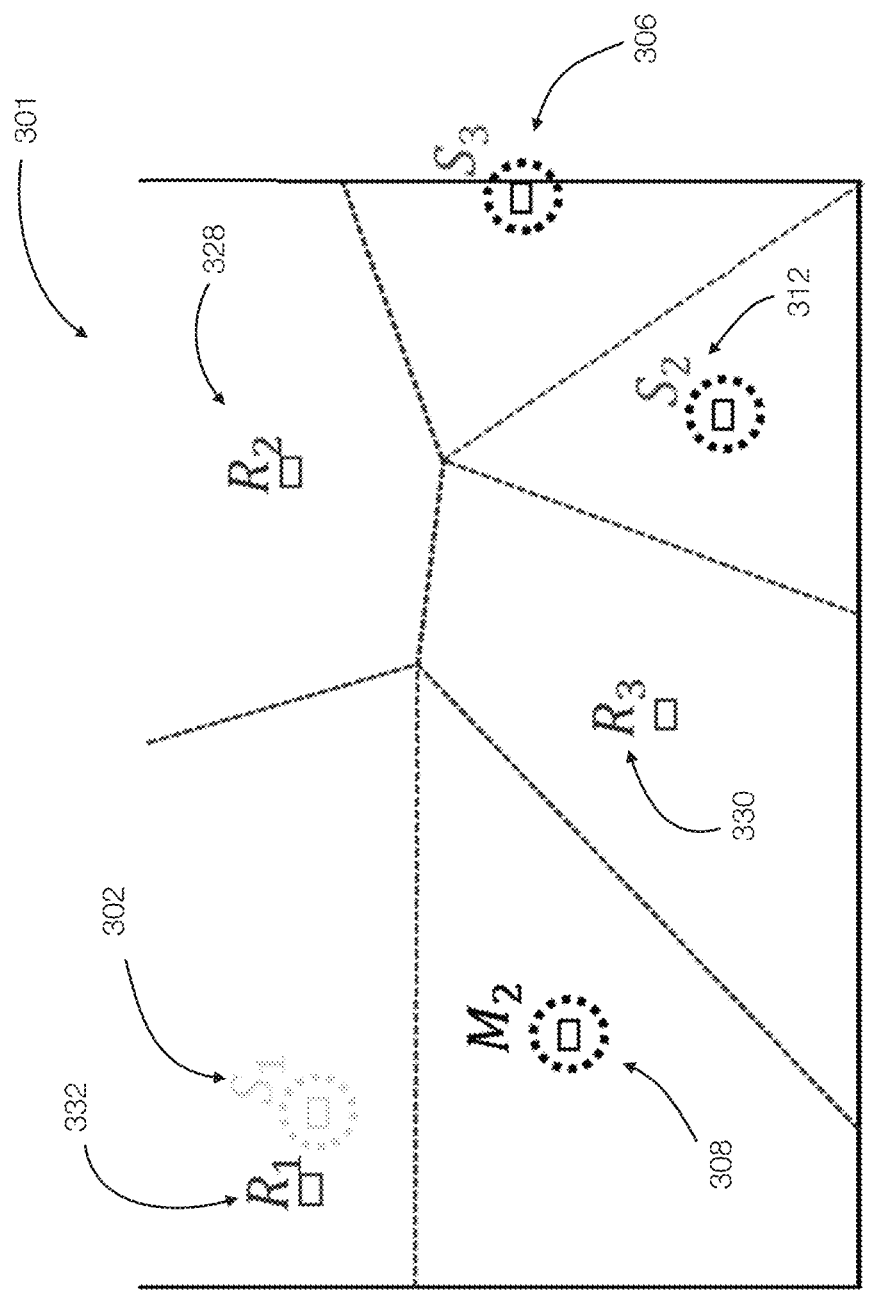
FIG. 3C discloses aspects of segmenting a space.

FIG. 3C discloses aspects of segmenting a space using the markers. The environment 300 is represented, in FIG. 3C, as a segmented space 301. The markers determined in FIG. 3C include the entities 306, 308, and 312 and receivers 328, 330, and 332.

In some examples, all of the markers in the set K of markers may not be used as markers for a segmentation operation. For example, if two stationary tags are too close (e.g., within a threshold distance) to each other or too close to a reader, one of the markers may be omitted. As illustrated in FIG. 3C, the entity 302 is not considered to be a marker or is not used as a marker due to its proximity to the reader 332. The reader 332 is used as the marker. Thus, markers may be omitted or excluded based on proximity to other markers. Generally, receivers are used as markers when possible at least because their position is known in advance and are not associated with noise/deviations. Thus, the marker 302 is discarded in favor of the marker 332 in this example.

A similar process may be performed to determine or define a set (L) of currently moving entities for the current cycle. In one example, the set L may be obtained as a result of the operation: L=C−K. However, the set L may be determined in other manners. For example, other sensors may be used to infer or determine movement such as accelerometers, inertial sensors, and the like.

The set L may be used in determining the occupancy score for each of the segments associated with the markers K. IN one example, the K markers refers to those that hare selected and used in the segmentation operation.

Figure 4:
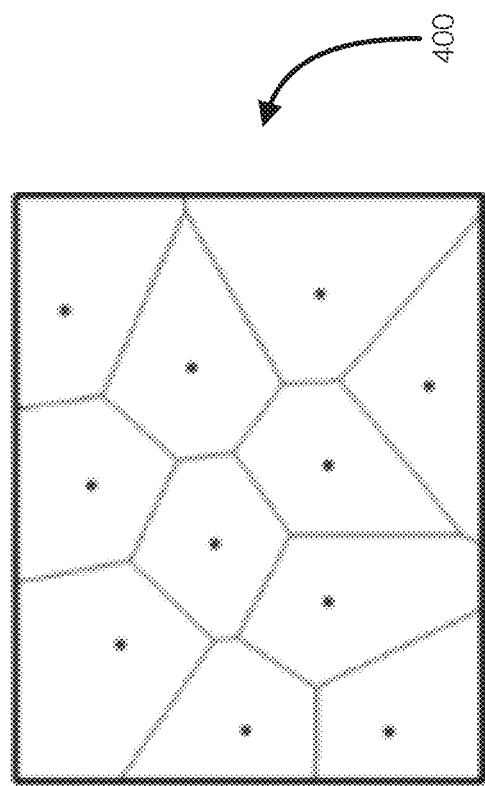
FIG. 4 discloses aspects of segmenting an environment to generate a segmented space.

FIG. 4 discloses aspects of segmenting an environment to generate a segmented space. FIG. 4 illustrates a result of an example process of segmenting an environment to generate a segmented space 400. In one example, the segmentation operation is performed (e.g., for each cycle). Thus, the segmentation space 400 may change over time or per cycle. The number and shapes of the segments may change from once cycle to the next cycle.

In one example, the segmentation operation is performed with respect to the markers that have been identified in the environment. In one example, tessellation or a form thereof (e.g., Fortune's algorithm) may be used to segment the space or environment based on the markers previously determined. In one example, the markers may be the input to the segmentation operation. The segmented space 400 is a visual representation of executing Fortune's algorithm to obtain a tessellation or a Voronoi diagram of a set of points (the markers) in one example.

If necessary, the number of markers can be manipulated in order to achieve a desired computing efficiency.

In one example, the occupancy score does not require the segmentation to be a proper tessellation. As a result, faster methods that do not ensure non-overlapping may be applicable. Other alternative segmentation operations may allow for segmentations that do not cover the whole environment (i.e., in which portions of the environment do not correspond to any segments). In that example, 'synthetic' segments may be created to cover the remaining portions of the environments (with an attributed occupancy of zero for the decision-making operation).

Once the markers have been determined and the space has been segmented, an occupancy score may be determined for each of the segments. The positions of the active mobile entities are considered against each segment. In one example, the occupancy score may be a weighted occupancy score. In one example, it may be sufficient to simply count the number of mobile entities in each of the segments. A mobile entity that overlaps two or more segments may contribute a partial score to each of the segments.

In addition, embodiments of the invention may also consider noise in the positioning readings of the mobile entities. In one example, due to a typical deviation in the positioning readings, an entity may intersect with more than one segment. In one example, the occupancy score or metadata may reflect a weighted occupancy score in some circumstances. When an entity overlaps multiple segments, larger overlaps in a given segment may result in a larger occupancy score or larger contribution to the occupancy score of that segment.

Figure 5:
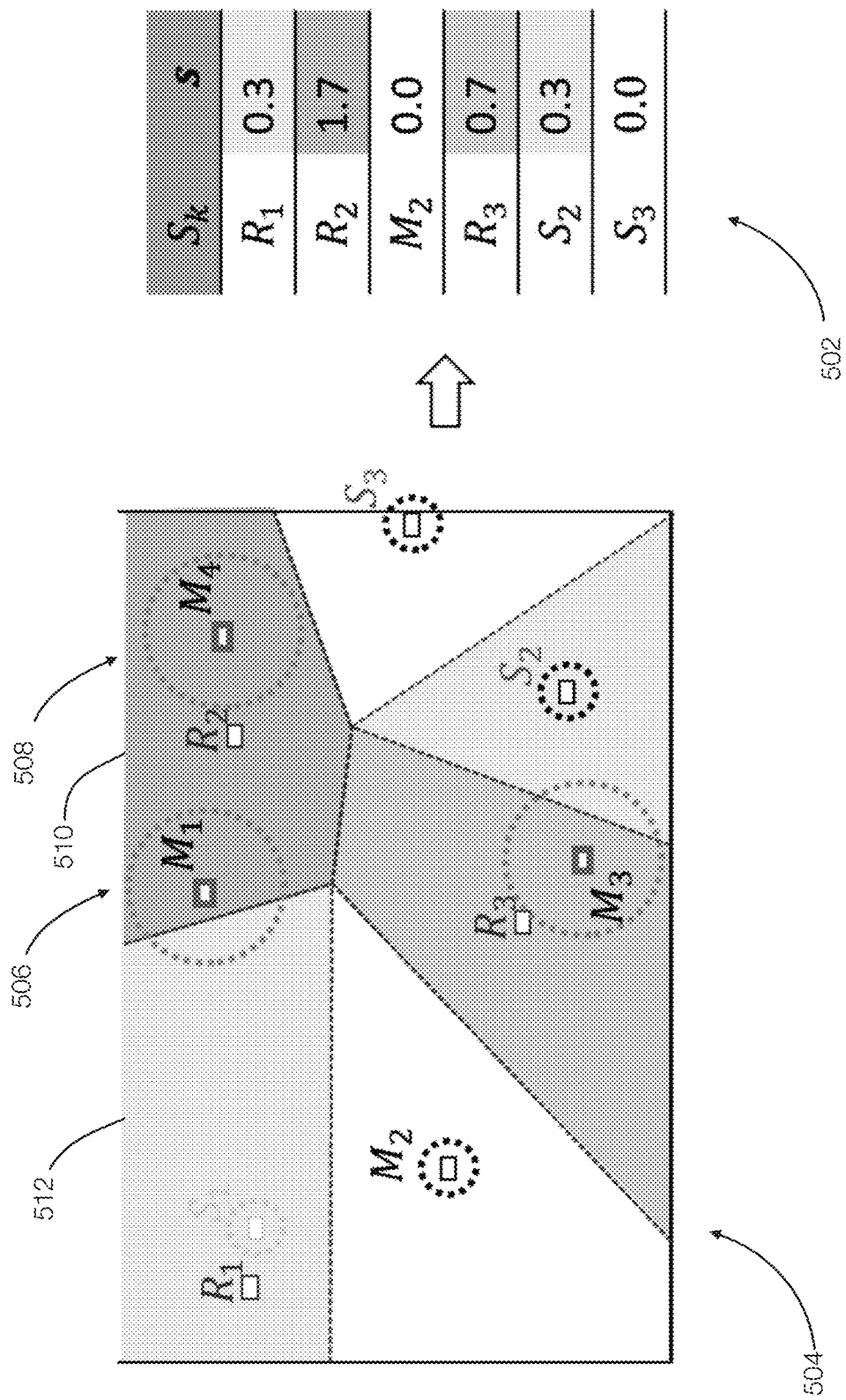
FIG. 5 discloses aspects of determining occupancy scores for a segmented space.

FIG. 5 discloses aspects of determining occupancy scores for a segmented space. In FIG. 5, a representative computation of occupancy scores 502 for the segments in the segmented space 504. In this example, occupancy scores s are determined for each segment $S_k$. In this example, the segments are referenced by the tag of the marker that defines the segment.

The occupancy scores are illustrated using a shading scale, with darker shades corresponding to higher occupancy scores. The occupancy scores range from 0 to 1.7 in this example as illustrated in the scores 502. The mobile entity 508 ($M_4$) completely intersects with the segment 510 ($R_2$) and thus the entity 508 only contributes to the occupancy score of the segment 510. The mobile entity 506 ($M_1$) partially intersects with the segment 510 ($R_2$) and with the segment 512 ($R_1$). Thus, the entity 506 may contribute to the occupancy scores of the segment 501 and 512 based on the overlap. The intersection between other mobile entities and the segments are illustrated in FIG. 5.

For each active mobile entity L, its likely position is determined as a circle defined by its position reading as the center and a typical deviation δ as the radius. The intersection between that circle and the polygon defined by the segment is added to the occupancy score of the segment. In one example, the area of the intersection may be divided by δ to obtain a normalized score.

In other embodiments, the computation may be extended to consider variable sized deviations. Thus, a potentially distinct $δ_i$ may be determined for each l∈L. In one example, the deviations are defined with respect to a distance from the entity 1's estimated position to the nearest marker or the marker of the corresponding segment.

Figure 6:
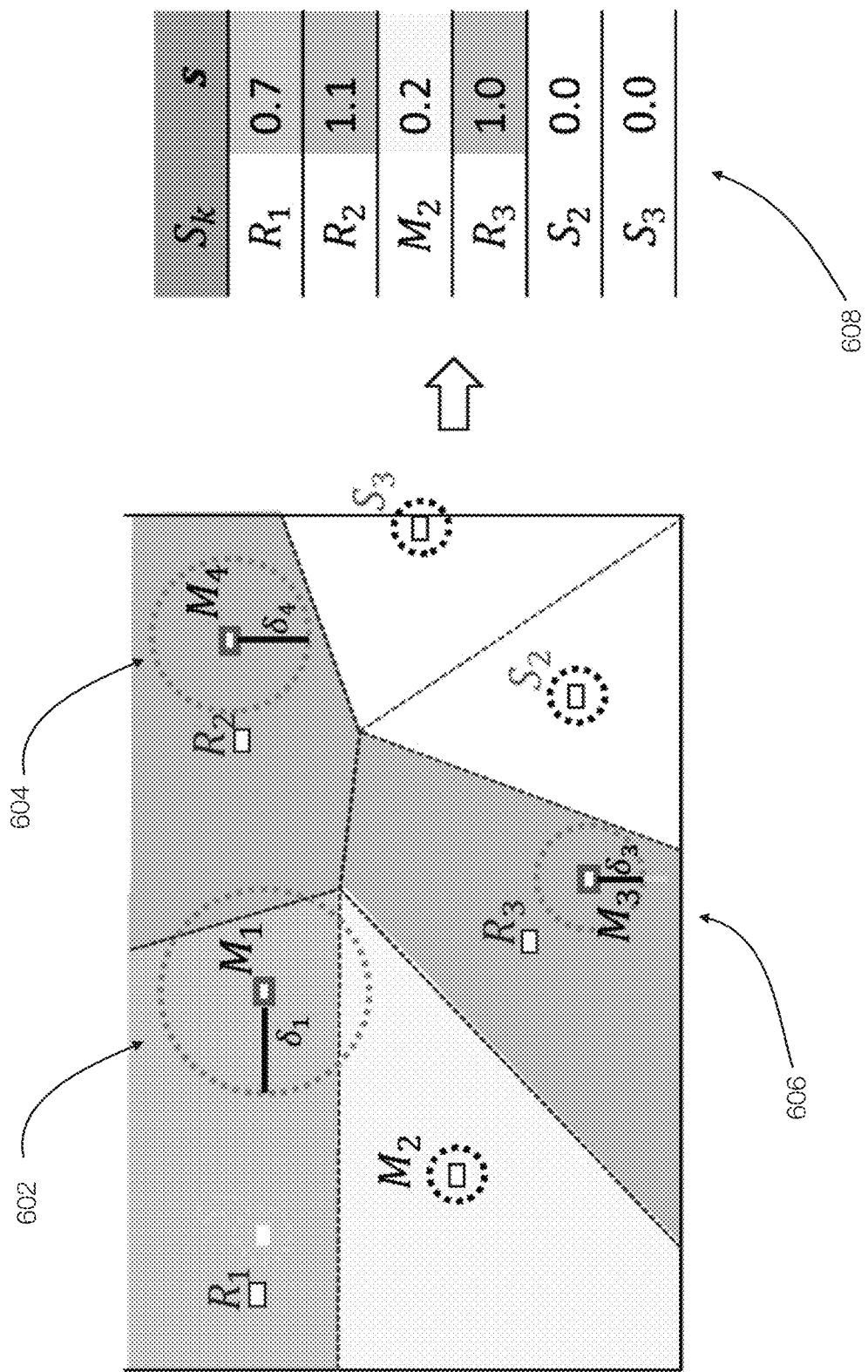
FIG. 6 illustrates aspects of occupancy scores using variable sized deviations.

FIG. 6 illustrates aspects of occupancy scores using variable sized deviations. In FIG. 6, the entities 602, 604, and 606 have different variations related to their distance to the relevant marker. This variable deviation can be used in determining the occupancy scores 608. As illustrated in FIG. 6, the occupancy scores 608 are different than the occupancy scores 502 due in part to using different deviations.

The example of FIG. 6 demonstrates the advantage of encoding or accounting for uncertainty information when available. For example, embodiments of the invention may include an assessment of the deviation for each current mobile entity obtained as an assessment of the noise observed in previous measurements for that particular entity (either specific to the positioning or to related sensors, such as accelerometers and gyroscopes). In this manner, occupancy scores can be generated for each of the segments in the segmented space.

Once occupancy scores are determined, the local occupancy information can be used for decision-making operations. Thus, decisions can be made based on localized information of segment specific information.

This decision making may take place at a central node in the edge environment, but in certain cases (including some that may require real-time evaluation), the decision making operation may be performed at the mobile entity itself (e.g., real-time event detection).

Figure 7:
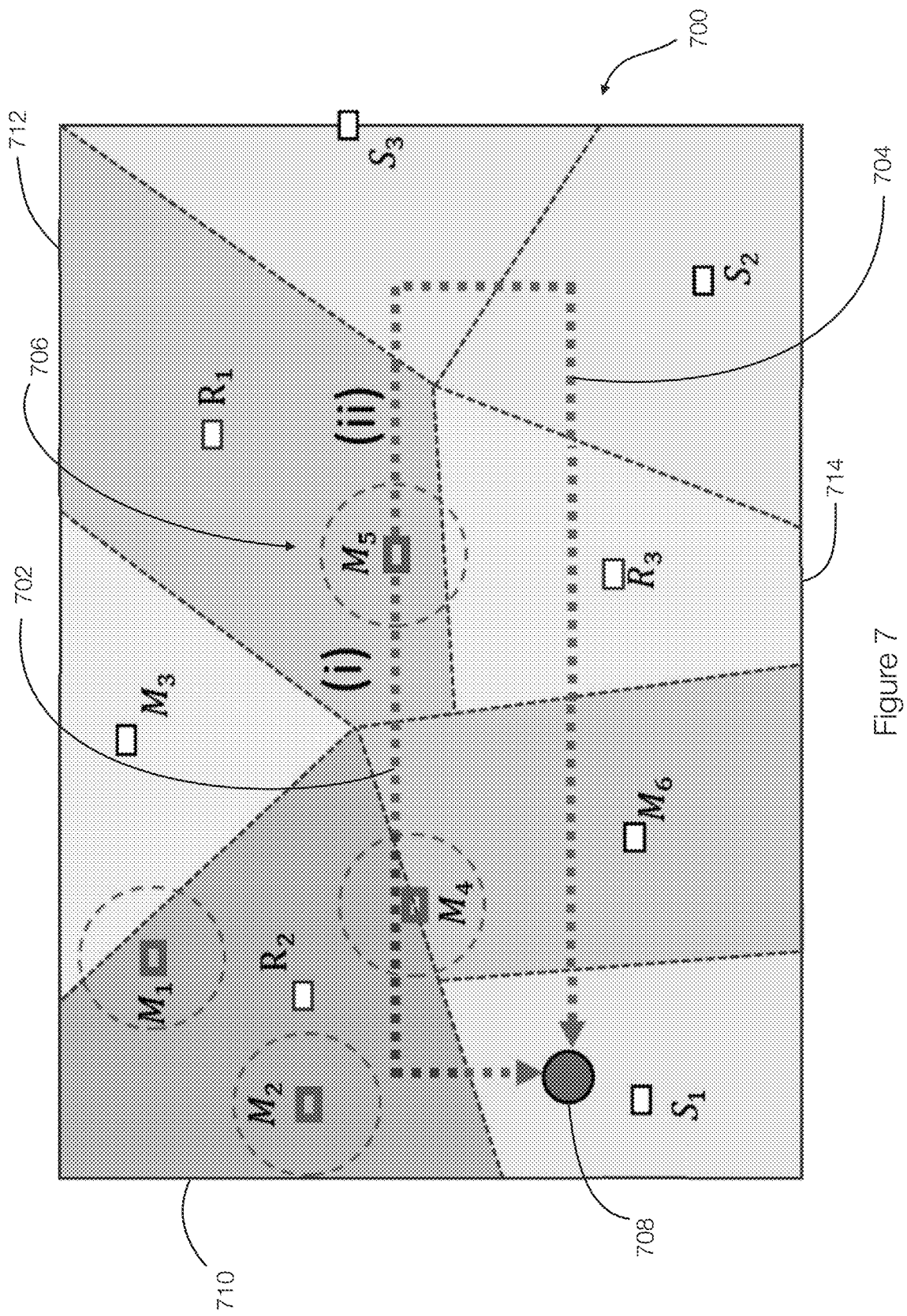
FIG. 7 discloses aspects of a decision making operation.

FIG. 7 discloses aspects of a decision making operation. More specifically, FIG. 7 discloses aspects of a pathfinding or routing operation. In one example, the pathfinding operation considers weights or occupancy for selecting a path or route to a destination. Various algorithms, such as Dijkstra's algorithm, may consider weights, which are associated with the cost of traversing parts of a trajectory and may be a function of distance and/or resource consumption. The occupancy scores in the segmented space 700 are represented by shading, with the segment 710 having the highest occupancy score.

In one example, the occupancy scores can be used as factors in the weights to identify or determine risk averse pathfinding. For example, FIG. 7 illustrates a path 702 and a path 704 from an entity 706 to a destination 708 in an environment. The path 704 is longer and more risk averse than the shorter path 702. However, a critical part of the path 702 through the segment 710 is through an area with a high occupancy score. Thus, the entity 706 may select the path 704 even though it is longer than the path 702 because it avoids crowded or high occupancy areas of the environment.

In some embodiments, determining occupancy data, such as occupancy score, may be altered or fine-tuned for each entity. For example, the entity 706 may not consider its own occupancy in the appropriate segments. As illustrated, the entity 706 contributed to the occupancy scores of the segments 712 and 714 due to the fact that the entity 706, when accounting for deviations, intersects with both the segments 712 and 714.

When fine-tuning from the perspective of the entity 706 in one example, the occupancy of the segments 712 and 714 may be zero when the entity 706 does not consider its own occupancy. However, this also comes with a corresponding computing cost.

Embodiments of the invention also relate to providing representations that are more appropriate for a particular task. The segmented space and occupancy scores can be mapped to different representations. For example, occupancy scores (or data or metadata) may be represented in a graph form or a grid form (other forms are possible). One benefit of determining occupancy scores is that the occupancy scores can be projected to multiple different and distinct representations.

Figure 8:
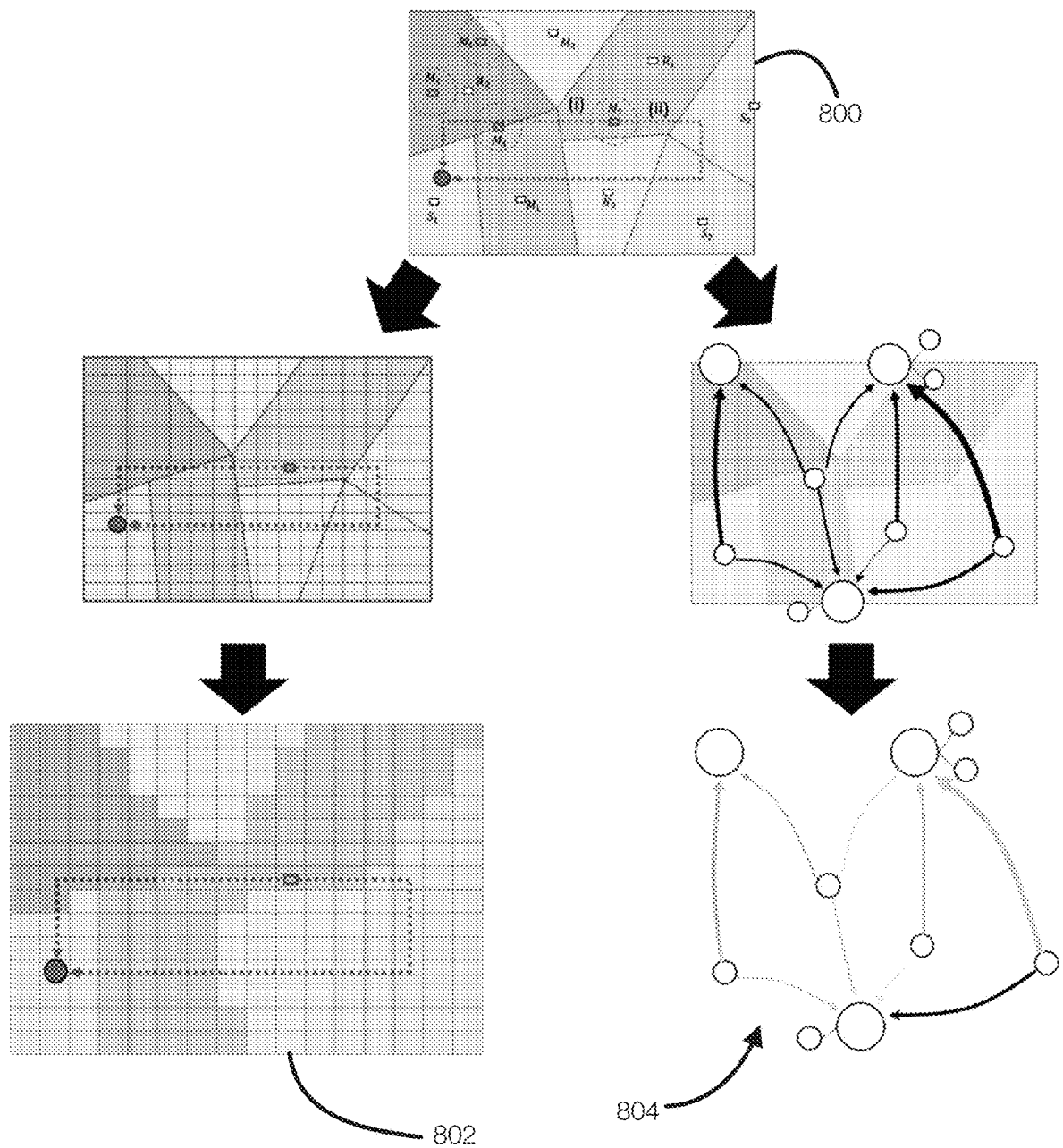
FIG. 8 illustrates an example of occupancy scores projected to a grid representation and a graph representation.

FIG. 8 illustrates an example of projecting occupancy scores to multiple representations. More specifically, FIG. 8 illustrates occupancy scores of a segmented space that are projected into a grid representation 802 and a graph representation 804. In one example, grids and graphs may both be used to with respect to operations or tasks such as pathfinding. However, these representations vary and may provide different insights into the task. A graph may be a generic representation while a grid may be adapted for efficiency as a grid may be a special case of a graph.

For example, current occupancy scores may be used to determine weights of cells in a grid based pathfinding operation (grid representation 802) and to determine weights of edges in a graph mapping loaded pallets and available containers (graph representation 804).

In the grid representation 802, the cells may be associated with a score corresponding to the occupancy score of the segment with which it has the highest intersection. Overlapping grids may receive a score that is based on the occupancy scores of the relevant segments. This allows a path to be routed not only through specific segments, but specific portions of specific segments. For the graph representation 804, the edges are attributed to the weight as the highest occupancy score of traversed segments.

Generating a segmented space is an example of a general representation that can be projected into other more specific representations. Further, the representations are dynamic and can be adapted as conditions, including occupancy, in the environment change.

Segmenting the space allows inactive (e.g., currently stationary mobile entities) to be considered as markers for a current cycle. This results in occupancy scores that are more confidently reflect occupancy from the perspective of active mobile entities. If a currently stationary entity begins moving, the occupancy scores can be adapted accordingly (e.g., a cycle may be triggered). When a stationary entity begins moving, embodiments of the invention can adapt, in one example, by generating a new segmentation and determining new or updated occupancy scores. In one example, a recently moving entity will be counted as an occupant and may significantly impact the locality of the segments and may reduce the number of segments in the environment.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, segmenting operations, scoring operations, positioning operations, decision making operations, pathfinding operations, inventory operations, or the like or combinations thereof. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers or VMs, or any combination of these, though no particular device implementation or configuration is required for any embodiment. Similarly, data storage system components such as databases, storage servers, storage volumes (LUNs), storage disks, for example, may likewise take the form of software, physical machines, containers, or virtual machines (VMs), though no particular component implementation is required for any embodiment.

As used herein, the term 'data' is intended to be broad in scope. Example embodiments of the invention are applicable to any system capable of storing and handling various types of objects, in analog, digital, or other form.

It is noted that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: reading tags associated with entities in an environment using a positioning system to determine positioning data for each of the entities in the environment, wherein each of the tags is associated with an entity, identifying markers based on the positioning data, wherein the markers include entities that are currently stationary segmenting the environment to generate a segmented space that includes segments, wherein each of the segments is associated with one of the markers, determining an occupancy score for each of the segments based on the positioning data of mobile entities in the environment for a current cycle, and performing an occupancy-aware operation based on the occupancy scores.

Embodiment 2. The method of embodiment 1, wherein the positioning system comprises an RFID system including RFID readers, wherein the tags are RFID tags.

Embodiment 3. The method of embodiment 1 and/or 2, wherein the positioning data is associated with the current cycle and includes one or more positions for each of the tags.

Embodiment 4. The method of embodiment 1, 2, and/or 3, wherein the markers are associated with one or more of permanently stationary entities, movable entities, and currently stationary mobile entities for the current cycle.

Embodiment 5. The method of embodiment 1, 2, 3, and/or 4, wherein mobile entities that overlap with multiple segments contribute to the occupancy scores of the multiple segments.

Embodiment 6. The method of embodiment 1, 2, 3, 4, and/or 5, wherein a position of each of the entities includes a deviation.

Embodiment 7. The method of embodiment 1, 2, 3, 4, 5, and/or 6, further comprising dynamically adjusting the occupancy scores.

Embodiment 8. The method of embodiment 1, 2, 3, 4, 5, 6, and/or 7, wherein dynamically adjusting the occupancy scores includes one or more of: starting a new cycle, determining stationary entities for the new cycle to identify a new set of markers, segmenting the space based on the new set of markers to generate a new segmented space, and determining occupancy scores based on mobile active entities in the new segmented space.

Embodiment 9. The method of embodiment 1, 2, 3, 4, 5, 6, 7, and/or 8, further comprising projecting the occupancy scores into a different representation required for the occupancy-aware operation.

Embodiment 10. The method of embodiment 1, 2, 3, 4, 5, 6, 7, 8, and/or 9, wherein the occupancy aware operation is a pathfinding operation in the environment.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the terms module, engine, services, client, agent, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
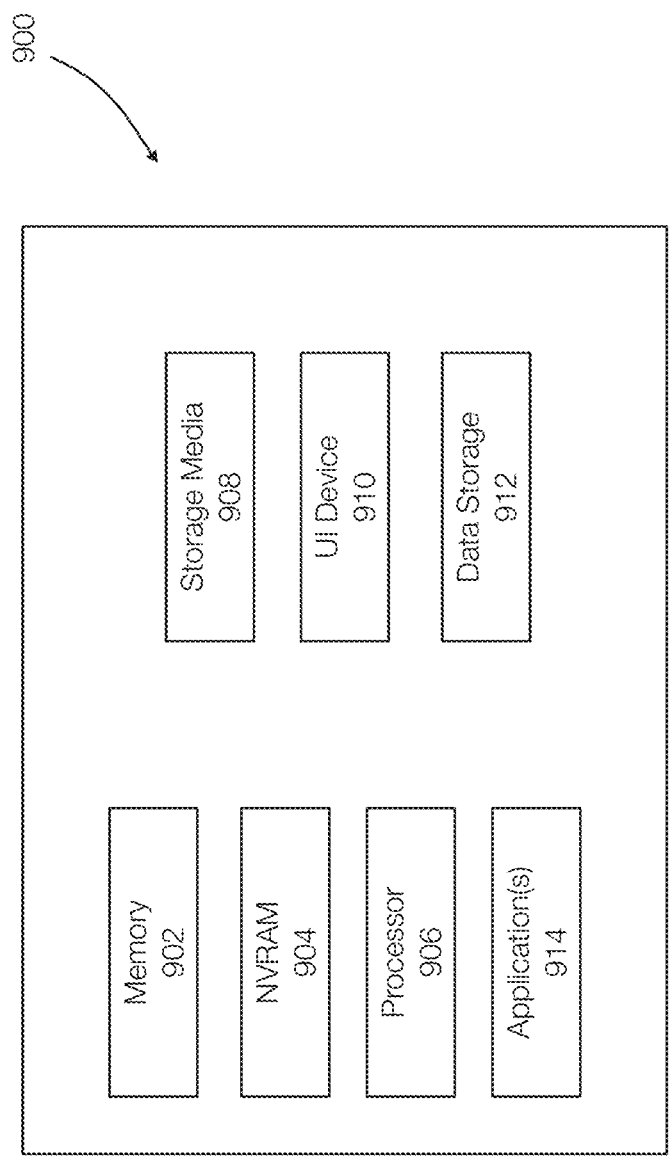
FIG. 9 discloses aspects of a computing device, system, or entity.

With reference briefly now to FIG. 9, any one or more of the entities disclosed, or implied, by the Figures, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
reading tags associated with entities in an environment using a positioning system to determine positioning data for each of the entities in the environment, wherein each of the tags is associated with an entity;
identifying markers based on the positioning data, wherein the markers include entities that are currently stationary;
segmenting the environment to generate a segmented space that includes segments, wherein each of the segments is associated with one of the markers;
determining an occupancy score for each of the segments based on the positioning data of mobile entities in the environment for a current cycle; and
performing an occupancy-aware operation based on the occupancy scores.

2. The method of claim 1, wherein the positioning system comprises an RFID system including RFID readers, wherein the tags are RFID tags.

3. The method of claim 1, wherein the positioning data is associated with the current cycle and includes one or more positions for each of the tags.

4. The method of claim 1, wherein the markers are associated with one or more of permanently stationary entities, movable entities, and currently stationary mobile entities for the current cycle.

5. The method of claim 1, wherein mobile entities that overlap with multiple segments contribute to the occupancy scores of the multiple segments.

6. The method of claim 5, wherein a position of each of the entities includes a deviation.

7. The method of claim 1, further comprising dynamically adjusting the occupancy scores.

8. The method of claim 7, wherein dynamically adjusting the occupancy scores includes one or more of:
   starting a new cycle;
   determining stationary entities for the new cycle to identify a new set of markers;
   segmenting the space based on the new set of markers to generate a new segmented space; and
   determining occupancy scores based on mobile active entities in the new segmented space.

9. The method of claim 1, further comprising projecting the occupancy scores into a different representation required for the occupancy-aware operation.

10. The method of claim 1, wherein the occupancy aware operation is a pathfinding operation in the environment.

11. A non-transitory storage medium having stored therein instructions that are executable by one or more hardware processors to perform operations comprising:
   reading tags associated with entities in an environment using a positioning system to determine positioning data for each of the entities in the environment, wherein each of the tags is associated with an entity;
   identifying markers based on the positioning data, wherein the markers include entities that are currently stationary;
   segmenting the environment to generate a segmented space that includes segments, wherein each of the segments is associated with one of the markers;
   determining an occupancy score for each of the segments based on the positioning data of mobile entities in the environment for a current cycle; and
   performing an occupancy-aware operation based on the occupancy scores.

12. The non-transitory storage medium of claim 11, wherein the positioning system comprises an RFID system including RFID readers, wherein the tags are RFID tags.

13. The non-transitory storage medium of claim 11, wherein the positioning data is associated with the current cycle and includes one or more positions for each of the tags.

14. The non-transitory storage medium of claim 11, wherein the markers are associated with one or more of permanently stationary entities, movable entities, and currently stationary mobile entities for the current cycle.

15. The non-transitory storage medium of claim 11, wherein mobile entities that overlap with multiple segments contribute to the occupancy scores of the multiple segments.

16. The non-transitory storage medium of claim 15, wherein a position of each of the entities includes a deviation.

17. The non-transitory storage medium of claim 11, further comprising dynamically adjusting the occupancy scores.

18. The non-transitory storage medium of claim 17, wherein dynamically adjusting the occupancy scores includes one or more of:
   starting a new cycle;
   determining stationary entities for the new cycle to identify a new set of markers;
   segmenting the space based on the new set of markers to generate a new segmented space; and
   determining occupancy scores based on mobile active entities in the new segmented space.

19. The non-transitory storage medium of claim 11, further comprising projecting the occupancy scores into a different representation required for the occupancy-aware operation.

20. The non-transitory storage medium of claim 11, wherein the occupancy aware operation is a pathfinding operation in the environment.

* * * * *